United States Patent [19]

Stieff

[11] Patent Number: 5,128,540
[45] Date of Patent: Jul. 7, 1992

[54] GAMMA RADIATION COMPENSATED RADON MEASUREMENT SYSTEM

[75] Inventor: Lorin R. Stieff, Kensington, Md.

[73] Assignee: RAD Elec, Inc., Frederick, Md.

[21] Appl. No.: 694,295

[22] Filed: May 1, 1991

[51] Int. Cl.$^5$ .............................................. G01T 1/00
[52] U.S. Cl. ..................... 250/255; 250/253
[58] Field of Search ...................... 250/255, 253, 472.1

[56] References Cited

U.S. PATENT DOCUMENTS

| | | | |
|---|---|---|---|
| 4,800,272 | 1/1989 | Harley et al. ...................... | 250/253 |
| 4,853,536 | 8/1989 | Dempsey et al. . | |
| 4,926,053 | 5/1990 | Dempsey et al. ...................... | 250/376 |
| 4,992,658 | 2/1991 | Ramsey, Jr. . | |
| 5,008,540 | 4/1991 | Dempsey . | |

OTHER PUBLICATIONS

Guggenheim, S. F., et al., "A Time-Integrating Environmental Radon Daughter Monitor", Health Phys., vol. 36, pp. 452-455, Pergamon Press Ltd., 1979, Great Britian.

Kotrappa et al., "A Practical E-PERM ™ (Electret Passive Environmental Radon Monitor) System for Indoor $^{222}$Rn Measurement", Health Physics, Apr., 1990, pp. 461-467.

Kotrappa et al., "An Electret Passive Environmental $^{222}$Rn Monitor Based on Ionization Measurement", Health Physics, Jan. 1988, pp. 47-56.

*Primary Examiner*—Janice A. Howell
*Assistant Examiner*—Richard Hanig
*Attorney, Agent, or Firm*—Cushman, Darby & Cushman

[57] ABSTRACT

A gamma radiation compensated radon measurement system includes a housing and cooperating tube assembly that define a first, larger sensing volume and second, smaller sensing volume, each of which includes an electrically charged electret. When in its operative configuration, the first and second volumes are in communication with one another so that both volumes are exposed to the same radon concentration as well as the same gamma radiation. A partition separates the two sensing volumes so that ions formed in one sensing volume do not enter the other sensing volume. The two electrets are exposed to their respective sensing volumes to accumulate ions at different rates determined by the design characteristics of the two sensing volumes. The response characteristic of each electret/sensing volume combination is mathematically modelled and the radon and/or gamma concentration is be determined by simultaneously solving the characteristic equations for each electret/sensing volume combination.

19 Claims, 3 Drawing Sheets

GAMMA RADIATION COMPENSATED RADON MEASUREMENT SYSTEM

TECHNICAL FIELD

The present invention relates to a gamma radiation compensated radon measurement system for measuring the concentration of radon in the environment and correcting that measurement for the gamma radiation contribution to the radon measurement.

BACKGROUND ART

Radon occurs naturally in the lower atmosphere as a consequence of the continuous radioactive decay of its longer-lived precursors in the soil and the eventual diffusion of the radon into the atmosphere. Radon is emitted from its precursors as a gas and can consist of one of three isotopes: $^{222}$Rn which occurs during the uranium disintegration series, $^{220}$Rn which occurs during the thorium disintegration series, and, lastly, $^{219}$Rn which occurs as a consequence of the actinium disintegration series. Of these three isotopes, $^{222}$Rn has the longest half-life at 3.823 days, and $^{219}$Rn has the shortest half-life at 3.92 seconds with $^{220}$Rn having an intermediate 51.5 second half-life. The transformation from the radon isotopes to the next lower atomic weight substance in the respective disintegration series is accompanied by the emission of energetic alpha particles, and, to a lesser extent, by beta particles.

It has been recognized that radon can accumulate in enclosed spaces and that prolonged exposure to radon can pose a health hazard. Various devices have been developed for the purpose of measuring radon concentrations in residential and commercial buildings with one goal being the time integration of low-level concentrations in the ambient air. Such devices include charcoal collectors, alpha-track detectors, and electret detectors. Alpha-track detectors employ an emulsion deposited on a film-like substrate. The emulsion is sensitive to the through passage of alpha particles. After the emulsion is developed or otherwise processed, small tracks created in the emulsion can be counted as an indication of the radon concentration. Electret detectors utilize a charged electret to attract ions formed by the passage of alpha particles in an enclosed space. The reduction in charge consequent to ion formation over time is an accurate indication of radon concentration. Representative electret detectors are disclosed in U.S. Pat. No. 4,992,658 entitled "An Electret Ion Chamber for Radon Monitoring" and U.S. Pat. No. 4,853,536 entitled "Ionization Chamber for Monitoring Radioactive Gas." These detectors are of the integrating type in that they continuously measure the average concentrations of radon gas over a period of several days or weeks.

Since electret detectors are responsive to ion concentration, they are also sensitive to gamma radiation. In most cases, the number of ions generated by background gamma radiation is small compared to those generated by radon decay. However, in certain parts of the world, the background gamma radiation can be high enough to affect the accuracy of the radon measurement. For example, uranium mining tailing, which produces both radon and higher than average gamma radiation, has been used as a construction material in the Grand Junction, Colo. area of the United States. Likewise, naturally occurring deposits of an organic shale, known as Swedish Kolm, have a high, natural gamma radiation characteristic. This material is found in the Scandinavian countries and has been used as a construction material. Accordingly, the accuracy of radon measurements by electret detectors in buildings constructed of these materials or in geographical areas having high natural gamma radiation levels can be adversely affected because of the higher than average gamma radiation contribution to the measurement.

As can be appreciated, a need exists for a radon measurement system that compensates for or otherwise takes into account the gamma radiation contribution to the radon measurement.

DISCLOSURE OF INVENTION

The present invention provides a gamma radiation compensated radon measurement system by which the radon measurement in an electret detector is corrected for any gamma radiation contribution to that measurement. First and second electrets, each having a known initial charge voltage, are mounted in respective sensing volumes that are exposed to the same radon concentration and the same ambient gamma radiation. Ions are generated in each sensing volume as a consequence of alpha particle emission during radon decay in that sensing volume and as a consequence of the background gamma radiation. The voltage potential of each electret is reduced as a function of the ions generated and attracted to the surface of the electret for the respective sensing volume. Those design parameters which affect the sensitivity of the charge reduction on each electret, including the initial value of the charge on the electret and the size of the sensing volume, are preferably different so that one electret/sensing volume combination has a sensitivity different from that of the other. The response characteristic of each electret/sensing volume combination is typically linear and can be mathematically modelled. The radon and/or gamma concentration can be determined by simultaneously solving the characteristic equation for each electret/sensing volume combination. Preferably, the sensitivity of one sensing volume to radon is enhanced relative to the other by making that sensing volume relatively larger so that alpha particles generated in that relatively larger volume will have longer probable path length than the probable path length of alpha particles in the relatively smaller sensing volume. Additionally, sensitivity to gamma radiation in the smaller sensing volume can be enhanced relative to the larger sensing volume by also using structures to utilize the bremsstrahlung effect to enhance ion formation in that sensing volume from the background gamma radiation. Further, electrets of different sensitivities can be used in the two sensing volumes, i.e., a relatively thick higher sensitivity electret in the relatively smaller volume and a relatively thin lower sensitivity electret in the relatively larger volume. The ambient atmosphere is admitted into the sensing volumes through a filter that is effective to block any dust or charged particles in the ambient air and which preferably has a through-filter diffusion rate such that the two shorter-lived radon isotopes ($^{220}$Rn and $^{219}$Rn having respective half-lives of 51.5 and 3.92 seconds) are substantially decayed and, accordingly, do not substantially affect the $^{222}$Rn concentration measurement.

In it broadest form, the present invention provides a gamma-corrected radon monitor that includes a first chamber which encloses a first sensing volume in which an electret is mounted and a second, smaller chamber which encloses a second, smaller sensing volume and in which another electret is mounted. Both sensing volumes are in communication with each other and are both exposed to the same radon concentration and the same background gamma radiation. A filter or other partition prevents ions formed in one chamber from entering the other. The first electret in the first, larger chamber preferably has a lower sensitivity than that of the second electret in the second, smaller sensing chamber. The two chambers are exposed to the ambient radon concentration and gamma radiation for a selected period of time. Because of the different sensing volumes, ions will form in each chamber at different rates, and, because of the different sensitivities of the first and second electrets, the voltage potentials of the two electrets will decline at different rates. The voltage potential for each electret is measured at the start and the end of the measurement test and, from these voltage drops and the predetermined sensing coefficients of the sensing chambers, the gamma-corrected radon measurement can be determined.

In a preferred embodiment, a collapsible two-chamber radon monitor includes a housing that defines the first, larger volume and the first sensing volume. A base is separably attached to the housing and carries a first disc-like electret that is charged to a selected voltage. The base and the housing are preferably fabricated from an electrically conductive plastic (i.e., carbon-filled) or are provided with an electrically conductive coating. The electret is fabricated from Teflon ™ that is charged to its operating potential by heating and cooling in a strong electrostatic field. The housing includes a reduced-diameter neck portion into which a telescoped tube assembly is fitted for sliding movement between an extended position and a collapsed position. When in its extended position, the tube assembly defines a second enclosed volume that is smaller than the first volume defined by the housing. A second electret is mounted at the distal end of the tube assembly for accumulating ions formed in the second sensing volume. The first and second volumes are in communication with one another so that both volumes are exposed to the same radon concentration as well as the same gamma radiation. A partition separates the two sensing volumes so that ions formed in one sensing volume do not enter the other sensing volume. The first electret preferably has a lower sensitivity than that of the second electret. Additionally, the tube assembly may include a portion thereof of a high-Z material, such as aluminum or other metal, that co-acts with the background gamma radiation to cause bremsstrahlung and thus enhance the sensitivity of the smaller sensing volume to gamma radiation relative to the larger sensing volume. The tube assembly is designed to collapse or telescope into the housing so that the sensing volume to which the two electrets are exposed is substantially reduced to effectively inhibit the two electrets when the tube assembly is in its collapsed or stowed position. When the tube assembly is deployed to it extended or operative position, the two electrets are exposed to their respective sensing volumes to begin ion accumulation at different rates determined by the design characteristics of the two sensing volumes.

In another embodiment, the first and second sensing chambers are defined by first and second collapsible bellows, each of which defines a different sensing volume. The two bellows are joined at a common end through an air entry partition/filter with a first electret mounted at the opposite end of the first bellows and the other electret mounted at the opposite end of the second bellows. Ambient air enters the bellows through one or more filtered ports so that both electrets are exposed to a common radon concentration as well as the same background gamma radiation. The partition prevents ions formed in one chamber from entering the other. Because of the different sensing volumes defined by the first and second bellows, ions will form in each sensing volume at different rates, and, because of the different sensitivities of the first and second electrets, the voltage potentials of the two electrets will decline at different rates. The decrease in the voltage potential for each electret is measured at the start and the end of the test and, from these voltage drops and the sensing coefficients of the chambers, the gamma-corrected radon measurement can be determined. The bellows that define the two sensing volumes can be moved from an extended position in which the two sensing volumes are defined to a collapsed position in which the sensing volumes are substantially eliminated to selectively enable and inhibit the radon monitor.

The present invention advantageously provides a gamma radiation compensated radon measurement system by which the ambient radon concentration can be corrected for the background gamma concentration and accordingly is especially useful in those areas having a high gamma background radiation.

BRIEF DESCRIPTION OF THE DRAWINGS

The present invention is described below, by way of example, with reference to the accompanying drawings, wherein.

BEST MODE FOR CARRYING OUT THE INVENTION

Figure 1:
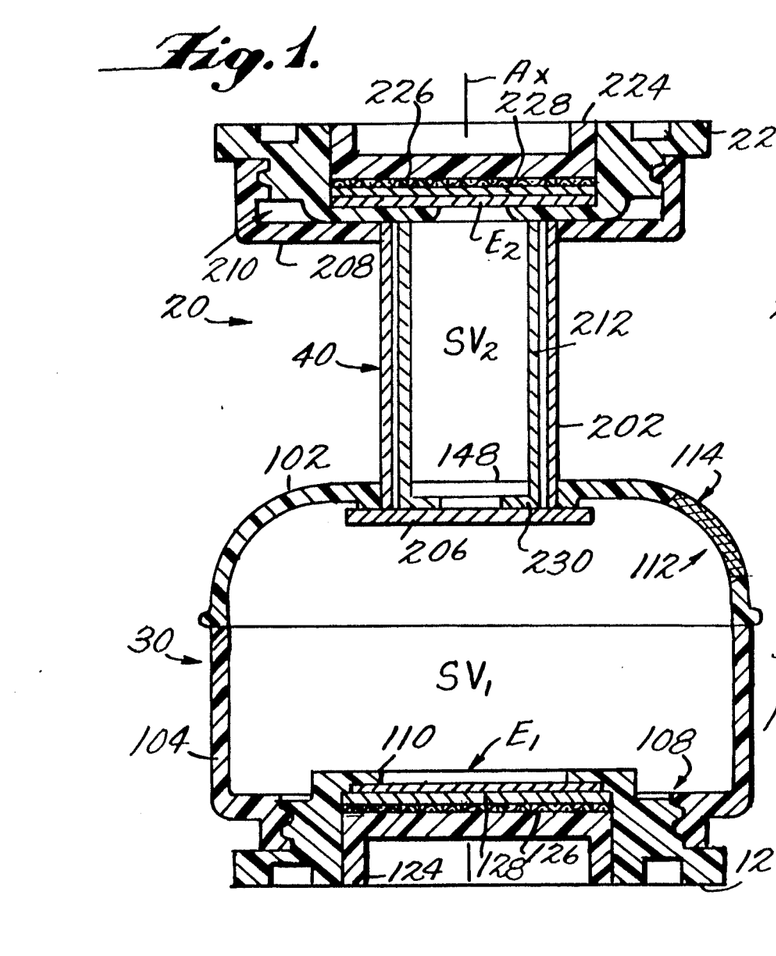
FIG. 1 is an elevational view, in cross-section, of a first embodiment of a gamma radiation compensated radon monitor in its enabled or measurement mode.
Figure 2:
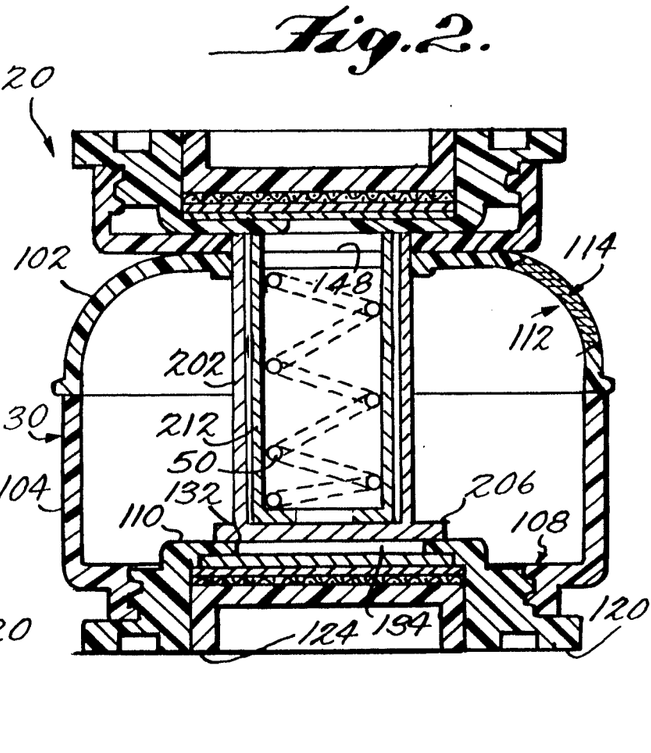
FIG. 2 an elevational view, in cross-section, of the gamma radiation compensated radon monitor of FIG. 1 in its collapsed, or inhibited mode.

A gamma radiation compensated radon monitor in accordance with the present invention is shown in FIGS. 1 and 2 and designated generally therein by the reference character 20. As shown in FIG. 1, the monitor 20 includes a first, lower housing 30 that defines a first sensing volume $SV_1$ and a telescoping tube assembly 40 that defines a second sensing volume $SV_2$. The housing 30 and the tube assembly 40 are structurally organized so that the tube assembly 40 is moveable between the extended position shown in FIG. 1 and the collapsed position shown in FIG. 2. The tube assembly 40, as explained below, can be locked into either of its extended or collapsed positions. A spring 50 (FIG. 2)

can be optionally provided to bias the tube assembly 40 toward the collapsed configuration (FIG. 2).

The housing 30 defines the first sensing volume $SV_1$ and is configured as a cylindrical lower portion 104 and a hemispherical upper portion 102. A generally circular base 120 is in threaded engagement, indicated generally at 108, with the open lower end of the housing 30. A disc-like electret $E_1$ is carried in the base 120 and is retained in place by an inwardly extending flange 110 that defines an opening (unnumbered) so that one side of the electret $E_1$ is exposed to the first sensing volume $SV_1$ enclosed by the housing 30. The electret $E_1$ is held in place against the flange 110 by a plug 124 that is received within a bore unnumbered) and which forces a conductive metal screen 126 and a layer of aluminum foil 128 against the back side of the electret $E_1$. The base 120 and the housing 30 are formed as a body of revolution about a central axis $A_x$ and are preferably fabricated from an electrically conductive plastic (i.e., carbon-filled) or are provided with an electrically conductive coating on the interior surface. The electret $E_1$ is fabricated from Teflon TM (polytetrafluoroethylene) that is initially charged by heating and cooling in a strong electrostatic field.

An ambient air input port 112 is provided in the wall of the hemispherical upper portion and has a filter 114 insert retained therein. When the radon monitor 20 not in use (during storage or shipping), the input port 112 can be blocked with adhesive tape (not shown). The filter 114 functions to filter ambient ions and dust particles from the interior of the monitor 20 and has a diffusion constant sufficiently long such that the two shorter-lived radon isotopes ($^{220}$Rn and $^{219}$Rn, having respective half-lives of 51.5 and 3.92 seconds) are substantially decayed and, accordingly, do not substantially affect the measurement.

Figures 3, 4:
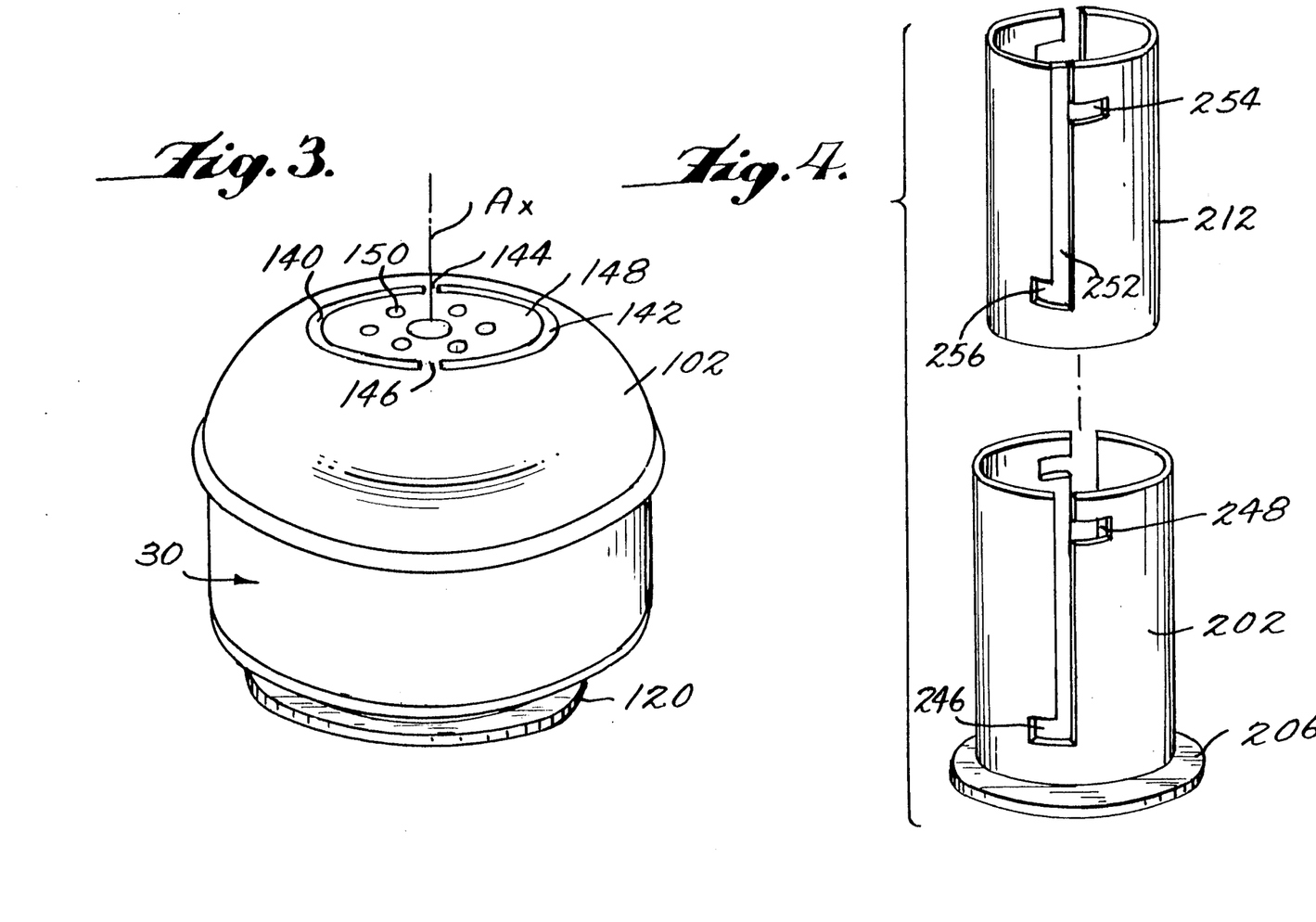
FIG. 3 is a perspective view of a larger volume chamber of the radon monitor illustrated in FIGS. 1 and 2.
FIG. 4 is an exploded perspective view of first and second telescoping tubes that define a smaller volume change of the radon monitor illustrated in FIGS. 1 and 2.

As shown in the exploded perspective view of FIG. 4, the tube assembly 40 is defined by an outer tube 202 and an inner, telescopically received tube 212. The outer tube 202 has a keeper disc 206 formed on or attached to its lower end and a pair of longitudinally extending, diametrically opposed slots 240 formed along a portion of its cylindrical sidewall. Each of the slots 240 has a circumferentially extending sub-slot 246 and 248 at its opposite ends. As shown, the sub-slots 246 and 248 extend in opposite circumferential directions from their longitudinal slot 240. The inner tube 212 is dimensioned to be telescopically and slidably received within the outer tube 202, preferably with a line-to-line fit, and also has a pair of longitudinally extending slots 252 formed on diametrically opposite sides. Laterally directed sub-slots 254 and 256 extend from opposite ends of the longitudinal slot 252 in opposite circumferential directions. The sub-slots 246 of the outer tube 202 extend a greater circumferential distance that the sub slots 256 of the inner tube 212, preferably a distance greater that the width of the longitudinal slots 240 and 252. As explained below, the tube assembly 40 can be locked in its extended or collapsed configuration by rotating the tube assembly 40 in one circumferential direction or the other to cause the sub-slots to engage a below-described locking tab. The inner tube 212 is preferably made of high-Z material, such as aluminum, to induce bremsstrahlung and enhance the sensitivity of the second sensing volume $SV_2$ to gamma radiation. The outer tube 202 is preferably fabricated from a plastic, such as the same plastic used to form the housing 30. As shown in the cross-sectional view of FIG. 1, the lower end of the inner tube 212 terminates in an inwardly extending annular flange 230 that defines an opening (unnumbered).

As shown in FIG. 3, the upper surface of the hemispherical upper portion 102 of the housing 30 includes first and second semicircular openings or slots 140 and 142 with radially aligned webs 144 and 146 separating the slots 140 and 142 to define a discoidal partition 148. As shown, a plurality of air holes 150 are provided in the partition 148 to effect gas communication between the two sensing volumes. The slots 140 and 142 each have a width in the radial direction equal to that of the thickness dimension of the inner and outer tubes 212 and 202 that define the tube assembly 40 and are formed at a diameter such that the tube assembly 40 can be received in the slots 140 and 142.

As can be appreciated from an inspection of FIGS. 1 and 2, the telescoped inner and outer tubes 212 and 202 of the tube assembly 40 are assembled with their respective longitudinal slots 252 and 240 co-aligned and inserted into the semicircular slots 140 and 142 with the webs 144 and 146 received in the aligned longitudinal slots 240 and 252. The tube assembly 40 can be locked in its extended position (FIG. 1) by rotating the tube assembly 40 counterclockwise so that the webs 144 and 146 are received by their respective aligned sub-slots 246 and 256. Conversely, the tube assembly 40 can be unlocked by clockwise rotation to return the webs 144 and 146 to the longitudinal slots 240 and 252 and moved to the collapsed position by pushing the tube assembly 40 into the housing 30 and then rotating the tube assembly 40 to cause the sub-slots 248 and 256 to receive the webs 144 and 146. The spring 50 may be optionally provided (FIG. 2) to bias the tube assembly 40 to its collapsed position. Because the sub-slots 246 of the outer tube 202 extend a greater circumferential distance than the sub-slots 256 of the inner tube 212, the outer tube 202 and be further rotated in the counterclockwise direction relative to the inner tube 212 when the tube assembly 40 is in its extended direction. The outer tube 202 is preferably further rotatable by a distance greater than the width of the longitudinal slots 240 and 252. As a consequence of this over rotation of the outer tube 212 relative to the inner tube 202, their respective longitudinal slots 240 and 252 are moved out-of-registration to effectively close the second sensing volume $SV_2$ within the tube assembly 40 from the ambient atmosphere.

A second disc-like electret $E_2$ is carried in an electret holder 220 mounted atop the upper end of the tube assembly 40. A flange 208 is provided with a threaded portion 210 which mates with the second electret holder 220 and which may be physically interchangeable with the corresponding structure of the base 120. A second plug 224, held in place by friction against the second electret holder 220, secures a second electret $E_2$ in a position against the flange 208 to define an opening (unnumbered) which exposes one side of the second electret $E_2$ to the interior of the tube assembly 40 and the second sensing volume $SV_2$. A metal screen or mesh 226 and an aluminum foil layer 228 define an electrical contact for the second electret $E_2$. The charge and thickness of the second electret $E_2$ may differ from that of the first electret $E_1$. In the preferred embodiment, the second electret $E_2$ is a thicker, higher sensitivity electret compared to the first electret $E_1$, which is typically a thinner, lower sensitivity electret.

It is desirable to provide the first and second sensing volumes $SV_1$ and $SV_2$ with different sensitivities to radon and gamma radiation. One sensing volume is made larger than the other so that alpha particles emitted in the larger sensing volume as a consequence of radon decay will have a longer probable trajectory during which ions are formed. In the smaller sensing volume, the probable alpha particle trajectory will be shorter (prior to impacting a constraining wall surface) to lower the probable number of ions formed. The gamma radiation of one sensing volume (i.e., the smaller sensing volume in the case of the present invention) is enhanced by the high-Z material to effect bremsstrahlung and thus enhance ion formation as a consequence of gamma radiation. As a consequence, the two sensing volumes, $SV_1$ and $SV_2$, will have different response characteristics, as explained below, to the common radon concentration and gamma radiation exposure.

The collapsed configuration of the tube assembly 40 corresponds to an "off" or inhibited position in which the electrets $E_1$ and $E_2$ are placed in an inhibited configuration. More specifically and as shown in FIG. 2, the disc-like keeper 206 at the lower end of the inner tube 202 engages the inner margin 132 of the flange 110 of the base 120 to define a small first air gap 134 (on the order of 0.05") between the exposed surface of the electret $E_1$ and the air gap. The number of ions generated within the reduced volume defined by the air gap 134 is small. In an analogous manner, the discoidal partition 148 at the top of the housing 30 acts as a keeper-like cover for the second electret $E_2$ when the tube assembly 40 is in the collapsed position.

Thus, when the charge on the electrets $E_1$ and 22 is measured before installation and the monitor 20 is stored in its "off" mode, i.e., the tube assembly 40 in its collapsed configuration, the first electret $E_1$ and the second electret $E_2$ will substantially retain their respective initial charge.

The extended configuration in which the tube assembly 40 is extended and locked into position with the outer tube 202 over rotated to move the longitudinal slots 240 and 252 to an out-of-registration alignment, represents the "on" position which exposes the electrets to the radon and gamma radiation environment to be measured. Radon diffuses naturally into both the first and second sensing volumes $SV_1$ and $SV_2$ through the filter 114; thus, both sensing volumes $SV_1$ and $SV_2$ are exposed to the same radon concentration. Gamma radiations have high energies and penetrate the various wall surfaces that define the housing 30 and the tube assembly 40. However, the two sensing volumes $SV_1$ and $SV_2$ are configured to have different sensitivities to gamma rays as explained above; accordingly, each electret will yield a different voltage decrement measurement. The two measurements can be calibrated to eliminate the gamma radiation contribution.

Equation (1) describes generally the relationship between radon concentration, gamma radiation flux, time and the change in electret voltage. An exemplary application of this description to an electret ion chamber is available in a paper by Kotrappa et al. entitled: "A practical E-PERM ™ (Electret Passive Environmental Radon Monitor) System for Indoor $^{222}Rn$ Measurement," Health Physics, April 1990, pp. 461–467 (referred to here as Kotrappa [1]).

$$Rn(pCi/l) = \frac{V_i - V_f}{(dT)(CF)} - BG \quad (1)$$

where:
Rn is the radon concentration in pico Curies per liter;
dT is exposure period;
$V_I$ and $V_f$ are the initial and final electret voltages;
CF is a calibration factor; and
BG is the equivalent radon concentration of background gamma radiation.

The calibration factor depends on the particular ion chamber design, and can be determined empirically as discussed in Kotrappa [1]. The equivalent radon concentration of gamma radiation can also be determined empirically as discussed in a paper by Kotrappa et al. entitled: "An Electret Passive Environmental $^{222}Rn$ Monitor Based on Ionization Measurement" Health Physics. January 1988, pp. 47–56 (referred to here as Kotrappa [2]). As can be seen, the change in electret voltage depends upon radon concentration and gamma radiation, as well as the exposure period, and the calibration factor of the chamber.

In the context of the disclosed embodiment, the first charged electret $E_1$ in the sensing volume $SV_1$ presents an electric field. Radon decay within first sensing volume $SV_1$ produces alpha particles which, in turn, generate ions within the first sensing volume $SV_1$. The first electret $E_1$ is oriented to present an electric field that induces some of those ions to collect on the exposed surface of the first electret $E_1$ and diminish is charge. Gamma rays penetrating the first volume also interact with the air to produce ions and some of these will also collect on the exposed surface of the first electret $E_1$. The net accumulation of ions results in a net decrease in measurable charge across the first electret $E_1$. The charge decrease, however, includes components of ions produced by radon decay and ions produced by gamma rays.

The relationship between radon concentration, gamma ray flux, time, and the change in voltage of the first electret $E_1$ can also be expressed in Equation (2), below, which equation is an application of Equation (1) for an actual first sensing volume $SV_1$.

$$Rn(pCi/l) = \frac{V_i^1 - V_f^1}{(dT_1)(CF_1)} - \mu R/hr \times .087 \quad (2)$$

where:
dT is exposure period for the first electret $E_1$;
$V_i^1$ and $V_f^1$ are the initial and final electret voltages for the first electret $E_1$;
CF is the calibration factor of the first chamber; and
$\mu R/hr \times 0.087$ is equivalent radon concentration of gamma radiation (BG) expressed as a calibration factor for the first sensing volume $SV_1$ multiplied by the gamma flux.

The second charged electret $E_2$ in the second chamber assembly 40 also presents an electric field within the second sensing volume $SV_2$. Radon decay within second sensing volume $SV_2$ produces ions which are induced by the electric field presented by the electret $E_2$ to collect on the exposed surface of the second electret $E_2$. Gamma rays penetrating the second sensing volume $SV_2$ also interact with the air to produce ions and some of these ions also collect on the exposed surface of the second electret $E_2$. The net accumulation of ions results in a net decrease in measurable charge across the electret $E_2$. The charge decrease includes the contribution by ions produced by radon and ions produced by gamma rays.

The second sensing volume $SV_2$ exhibits a different balance of sensitivity to radon and gamma radiation than the first sensing volume $SV_1$. In the preferred embodiment, the second sensing volume $SV_2$ is smaller than the first sensing volume $SV_1$. More specifically, alpha particles emitted during radon decay generate ions as they traverse their sensing volume until their energy is dissipated in ion formation or they impact a constraining wall surface. In a sufficiently large volume, a greater proportion of alpha particles dissipate their available energy before impinging on a wall. In a smaller volume, a greater proportion of alpha particles impinge on a wall before dissipating their available energy. A smaller volume therefore has lower response per unit volume than a larger chamber. Additionally, the inner tube 212 increases the sensitivity of the second sensing volume $SV_2$ to gamma radiation by virtue of the bremsstrahlung effect, especially when made of a high-Z material. Gamma rays striking the high-Z material interact to produce a shower of ions. Thus, the larger volume, low-Z first sensing volume $SV_1$ exhibits a different balance of sensitivities to radon and gamma radiation than the smaller, high-Z lined second sensing volume $SV_2$.

The relationship between radon concentration, gamma ray flux, time, and the change in voltage of the second electret $E_2$ can be expressed more precisely in algebraic terms, as in Equation (3), which is an application of Equation (1) to an actual second sensing volume $SV_2$.

$$Rn(pCi/l) = \frac{V_i^2 - V_f^2}{(dT_2)(CF_2)} - \mu R/hr \times 0.012 \quad (3)$$

where:

dT is exposure period for the second electret $E_2$;

$V_i^2$ and $V_f^2$ are the initial and final electret voltages for the second electret $E_2$;

$CF_2$ is the calibration factor of the second sensing volume; and $\mu R/hr \times 0.012$ is equivalent radon concentration of gamma radiation (BG) expressed as gamma flux multiplied by the calibration factor for the second sensing volume $SV_2$.

The differing sensitivities of the two sensing volumes to gamma radiations can be calibrated to factor out the gamma radiation contribution and allow a compensated radon measurement. This can be understood at one level by empirically testing dual volumes for differing levels of gamma radiation flux and radon concentration to establish calibration curves. The relationship between radon concentration, gamma radiation flux, electret voltage changes, and exposure periods can also be expressed in closed form by simultaneously solving equations (2) and (3) for the value of radon concentration. In those equations, radon concentration and gamma radiation flux (expressed as equivalent radon) are variables. Eliminating radon flux leaves radon concentration in terms of electret voltage changes, exposure times, and calibration factors as presented in Equation (4).

$$Rn(pCi/l) = \frac{1}{3.161}\left[\frac{V_i^1 - V_f^1}{.087(dT_1CF_1)} - \frac{V_i^2 - V_f^2}{0.12(dT_2CF_2)}\right] \quad (4)$$

For a dual ion chamber approximately as illustrated in FIGS. 1–4, representative values may be as follows:

| | |
|---|---|
| $V_i^1$ = 700 volts | $V_i^2$ = 700 volts |
| $V_f^1$ = 500 volts | $V_f^2$ = 658 volts |
| dT = 29.66 days | dT = 29.66 days |
| $\mu R/hr$ = 10 | $\mu R/hr$ = 10 |
| Rn = 2.4 | Rn = 2.4 |
| $CF_1$ = 2.06 | $CF_2$ = 2.06 |
| Rn = 2.40 pCi/l | $\mu R/hr$ = 9.99 |

Operation of the radon monitor 20 consists of inserting first and second calibrated electrets $E_1$ and $E_2$ in the first and second sensing volumes $SV_1$ and $SV_2$ as disclosed above and moving the tube assembly 40 to its fully extended position (FIG. 1) in an environment whose radon content is to be a measured over a period of time, and measuring the change in electret charges at the conclusion of the measurement period. The decrement in charge of the two electrets can compared to calibration references to indicate a gamma radiation compensated radon concentration measurement. Alternately, equation (4) can be used to convert the electret voltage change measurements into an equivalent value for into radon concentration terms. As can be appreciated, a monograph can be used to effect the radon concentration calculation.

Figures 5, 6:
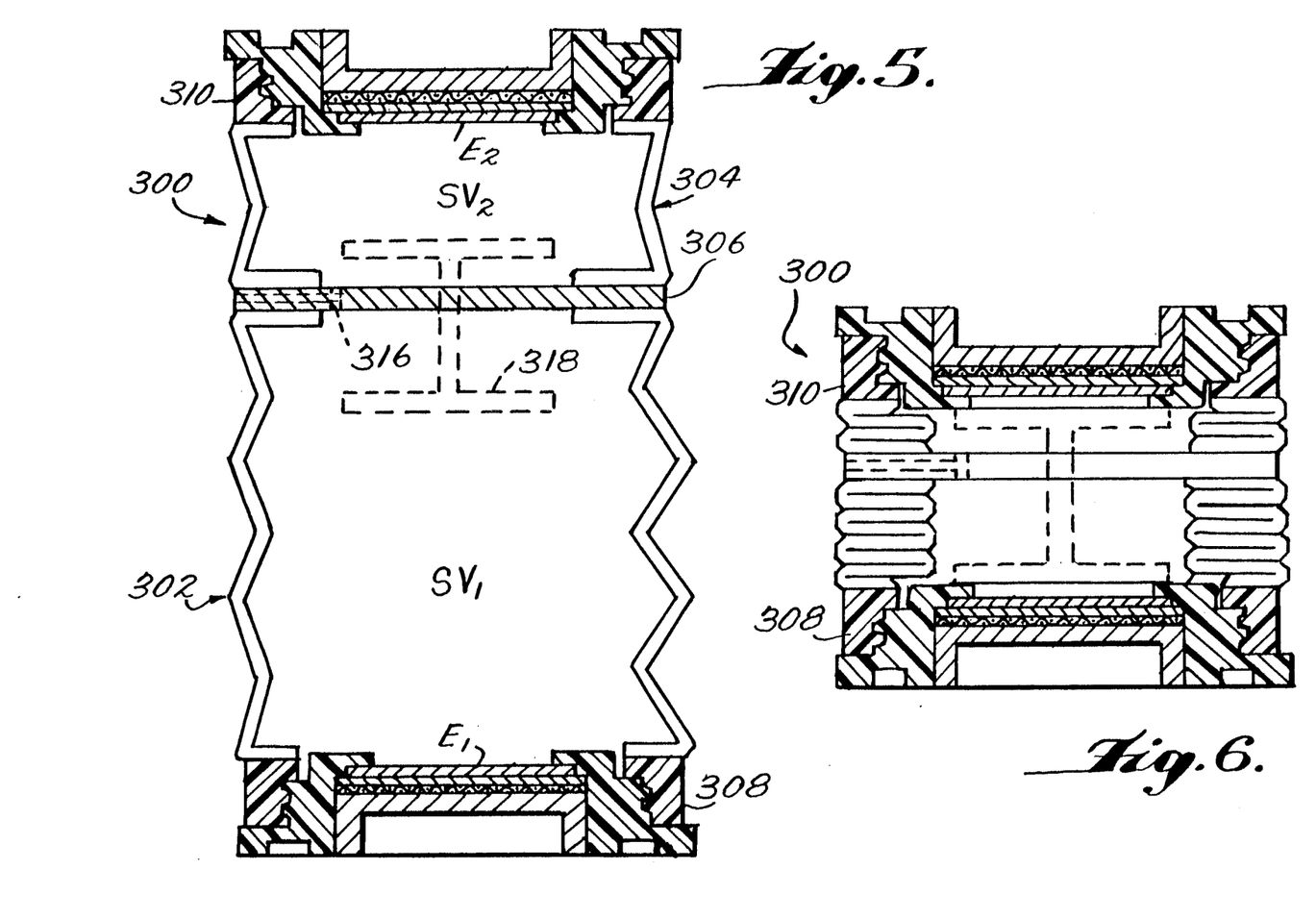
FIG. 5 is an elevational view, in cross-section, of a second embodiment of a gamma radiation compensated radon monitor in its enabled or measurement mode.
FIG. 6 an elevational view, in cross-section, of the gamma radiation compensated radon monitor of FIG. 5 in its collapsed, or inhibited mode.

A second embodiment of a gamma corrected radon monitor in accordance with the present invention is shown in FIGS. 5 and 6 and designated therein by the reference character 300. As shown, the monitor 300 includes a first bellows 302 and a second bellows 304 secured at a common interface to a combined partition/filter 306. The distal end of the lower bellows 302 includes a fitting 308 and, in a like manner, the distal end of the upper bellows 304 includes a like fitting 310. The fittings 308 and 310 are internally threaded and designed to accept electret holders of the type described above in relationship to FIGS. 1–4 with the first electret $E_1$ exposed to the first sensing volume defined by the bellows 302 and the second electret $E_2$ exposed to the second sensing volume 314. The first bellows 302 is preferably fabricated from a molded plastic and either electrically conductive (i.e., carbon filled) or includes an electrically conductive coating. The second bellows 304 is preferably fabricated from a high-Z material, such as aluminum, and can be formed as a weldment by welding annular discs together. The partition 306 is permeable to admit the ambient atmosphere into each sensing chamber and can be fabricated from a rigid sintered material. In the alternative, the partition 306 can be provided with through passages 316 (dotted-line illustration) that include a filter material to admit $^{222}$radon while blocking dust and ambient charged particles and having a diffusion rate such that the two shorter-lived isotopes of radon are not admitted. As in the case of the first embodiment, removeable adhesive tape (not shown) can be used to seal the monitor 300 during shipping or storage. As shown in dotted-line illustration, a keeper structure 318 is secured to the partition 306.

The radon monitor 300 is configurable between the extended position in FIG. 5 in which the device is operable to respond to radon and gamma radiation in a manner analogous to that described above the the embodiment of FIGS. 1–4 and a collapsed, inoperable configuration as shown in FIG. 6. As shown therein, the two bellows 302 and 304 are collapsed to their compressed state to that each electret $E_1$ and $E_2$ face a respective surface of the keeper structure 318 (dotted-line illustration) to effectively inhibit the radon monitor 300 from operation. The radon monitor 300 is normally maintained in its collapsed 'inhibit' state by its shipping package and is intended to self-expand to its operable state when unpacked.

The present invention advantageously provides a gamma radiation compensated radon measurement system by which the ambient radon concentration can be corrected for the background gamma concentration. The present invention is particularly useful as a time intergrating radon sensor in those environments having a higher than usual radon concentration.

I claim:

1. A radon measurement system, comprising:
   means for defining a first sensing volume ($SV_1$) and a second sensing volume ($SV_2$);
   a first electret ($E_1$) mounted to attract ions generated in said first sensing volume as a consequence of radon decay or gamma radiation therein; and
   a second electret ($E_2$) mounted to attract ions generated in said second sensing volume as a consequence of radon decay or gamma radiation therein, the relative sensitivity of said second sensing volume to radon and gamma radiation being different from that of said first sensing volume.

2. The radon measurement system of claim 1, wherein the first sensing volume is larger than the second sensing volume to enhance the radon sensitivity of the first electret.

3. The radon measurement system of claim 1, further comprising means for causing the bremsstrahlung effect in response to gamma radiation to enhance the gamma sensitivity of the second sensing volume.

4. The radon measurement system of claim 1, wherein the first electret has a lower sensitivity to ions than the second electret.

5. A radon measurement system, comprising:
   means for defining a first sensing volume ($SV_1$);
   means for defining a second sensing volume ($SV_2$);
   a first electret ($E_1$) mounted to attract ions generated in the first sensing volume as a consequence of radon decay or gamma radiation therein;
   a second electret ($E_2$) mounted to attract ions generated in the second sensing volume as a consequence of radon decay or gamma radiation therein; and
   filter means (114,306) for exposing the first and second volumes to the ambient atmosphere while precluding ambient charged particles and ions therefrom;
   a one of the first- or second-mentioned means adjustable between a first position to define its sensing volume and a second position to define a minimum volume in which its electret is precluded from ion sensing.

6. The radon measurement system of claim 5, wherein:
   the other of the first- or second-mentioned means is adjustable between a first position to define its sensing volume and a second position to define a minimum volume in which its electret is precluded from ion sensing.

7. The radon measurement system of claim 6, wherein the first-mentioned means in its first position defines a sensing volume that is larger than the second sensing volume defined by the second-mentioned means in its first position to enhance the radon sensitivity of the first electret.

8. The radon measurement system of claim 5, further comprising means for causing the bremsstrahlung effect in response to gamma radiation to enhance the gamma sensitivity of the second sensing volume.

9. The radon measurement system of claim 7, wherein the first electret has a lower sensitivity to ions than the second electret.

10. A radon measurement system, comprising:
    a first bellows structure (302) for defining a first sensing volume ($SV_1$);
    a second bellows structure (304) for defining a second sensing volume ($SV_2$);
    a first electret ($E_1$) mounted to attract ions generated in the first sensing volume as a consequence of radon decay or gamma radiation therein;
    a second electret ($E_2$) mounted to attract ions generated in the second sensing volume as a consequence of radon decay or gamma radiation therein; and
    filter means (306) for exposing the first and second volumes to the ambient atmosphere while precluding ambient charged particles and ions therefrom;
    the first bellows structure and the second bellows structure adjustable between a respective first position to define its respective sensing volume and a respective second position to define a respective minimum volume in which the respective electret is precluded from ion sensing.

11. The radon measurement system of claim 10, wherein the first bellows structure in its first position defines a sensing volume that is larger than the second sensing volume defined by the second bellows structure in its first position to enhance the radon sensitivity of the first electret.

12. The radon measurement system of claim 10, further comprising means for causing the bremsstrahlung effect in response to gamma radiation to enhance the gamma sensitivity of the second sensing volume.

13. The radon measurement system of claim 10, wherein the first electret has a lower sensitivity to ions than the second electret.

14. The radon measurement system of claim 10, wherein the first bellows structure and the second bellows structure are connected at a common end through the filter means, the first electret mounted in the first bellows structure at the end thereof opposite its common end, and the structure electret mounted in the second bellows structure at the end thereof opposite its common end.

15. The radon measurement system of claim 10, further comprising:
    keeper means (318) for inhibiting the first and second electret from sensing when the first and second bellows structures are in their respective second positions.

16. A radon measurement system, comprising:
    a container (30) defining a first sensing volume ($SV_1$) and having a first electret ($E_1$) therein for sensing ions generated in the first sensing volume as a consequence of radon decay or gamma radiation therein:
    a telescoping tube assembly (40) connected to the container and movable to a first position to define a second sensing volume ($SV_2$) smaller than the first sensing volume and having a second electret ($E_2$) mounted therein to attract ions generated in the second sensing volume as a consequence of radon decay or gamma radiation therein and movable to a second position to define a minimum volume thereof; and filter means (114) for exposing the first and second volumes to the ambient atmosphere while precluding ambient charged particles and ions therefrom.

17. The radon measurement system of claim 16, wherein the telescoping tube assembly is fabricated from a material for causing the bremsstrahlung effect in response to gamma radiation to enhance the gamma sensitivity of the second sensing volume.

18. The radon measurement system of claim 16, wherein the first electret has a lower sensitivity to ions than the second electret.

19. The radon measurement system of claim 16, further comprising:
    keeper means (206, 148) for inhibiting the first and second electrets from sensing when the telescoping tube assembly is in its second position.

* * * * *